(12) United States Patent
Liu

(10) Patent No.: US 7,590,155 B2
(45) Date of Patent: Sep. 15, 2009

(54) HYBRID HIGH POWER LASER TO ACHIEVE HIGH REPETITION RATE AND HIGH PULSE ENERGY

(76) Inventor: Jian Liu, 1773 Karameos Ct., Sunnyvale, CA (US) 94087

(\*) Notice: Subject to any disclaimer, the term of this patent is extended or adjusted under 35 U.S.C. 154(b) by 173 days.

(21) Appl. No.: 11/198,078

(22) Filed: Aug. 4, 2005

(65) Prior Publication Data

US 2006/0029111 A1 Feb. 9, 2006

Related U.S. Application Data

(60) Provisional application No. 60/598,836, filed on Aug. 5, 2004.

(51) Int. Cl.
*H01S 3/30* (2006.01)

(52) U.S. Cl. ............... 372/6; 372/18; 372/70; 372/71

(58) Field of Classification Search ........ 372/6, 372/18, 70
See application file for complete search history.

(56) References Cited

U.S. PATENT DOCUMENTS

| | | | | |
|---|---|---|---|---|
| 5,166,940 A | * | 11/1992 | Tumminelli et al. | 372/6 |
| 5,455,835 A | * | 10/1995 | Atkins et al. | 372/6 |
| 5,511,083 A | * | 4/1996 | D'Amato et al. | 372/6 |
| 5,898,211 A | * | 4/1999 | Marshall et al. | 257/601 |
| 6,041,070 A | * | 3/2000 | Koch et al. | 372/6 |
| 6,160,824 A | * | 12/2000 | Meissner et al. | 372/7 |
| 6,256,327 B1 | * | 7/2001 | Goldberg | 372/22 |
| 6,288,835 B1 | * | 9/2001 | Nilsson et al. | 359/341.3 |
| 6,347,007 B1 | * | 2/2002 | Grubb et al. | 359/337.21 |
| 2002/0012378 A1 | * | 1/2002 | Zenteno | 372/108 |
| 2003/0031411 A1 | * | 2/2003 | Arbore et al. | 385/37 |
| 2003/0161375 A1 | * | 8/2003 | Filgas et al. | 372/66 |
| 2004/0120367 A1 | * | 6/2004 | Siepmann | 372/25 |
| 2004/0263950 A1 | * | 12/2004 | Fermann et al. | 359/333 |

\* cited by examiner

*Primary Examiner*—Minsun Harvey
*Assistant Examiner*—Xnning Niu
(74) *Attorney, Agent, or Firm*—John M. Taboada

(57) ABSTRACT

A fiber laser cavity that provides a new pulse shaping and spectral shaping technique is disclosed in this invention to achieve the purpose of resolving the difficulties arising from the issues related to Q-switched solid state lasers. The laser system achieves high repetition rate (1 kHz-100 kHz) and high pulse-to-pulse energy stability with small timing jitter of the laser pulses and scalable to the Joule pulse energy level. The laser system of this invention employs new approach with a hybrid fiber/waveguide master Oscillator-High Power Amplifier (MOPA) laser system in combination with the pulse shaping technology that allows not only to scale the fiber laser pulse energy to the multi-Joule level with high pulse-to-pulse energy stability but also achieve precise control of laser pulse timing jitter in a scale of <100 ps that is at least 5 to 10 time more accurate than for Q-switched systems where the same parameter reaches 500-1000 ps range.

24 Claims, 8 Drawing Sheets

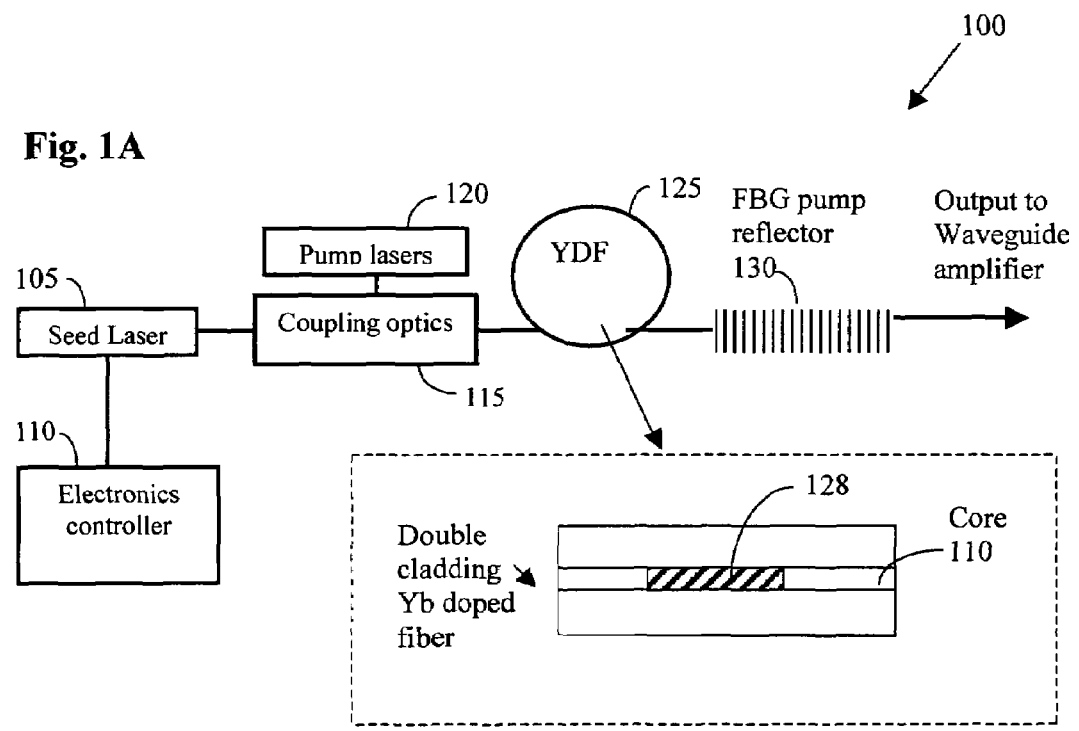
Fig. 1A
Fig. 1B
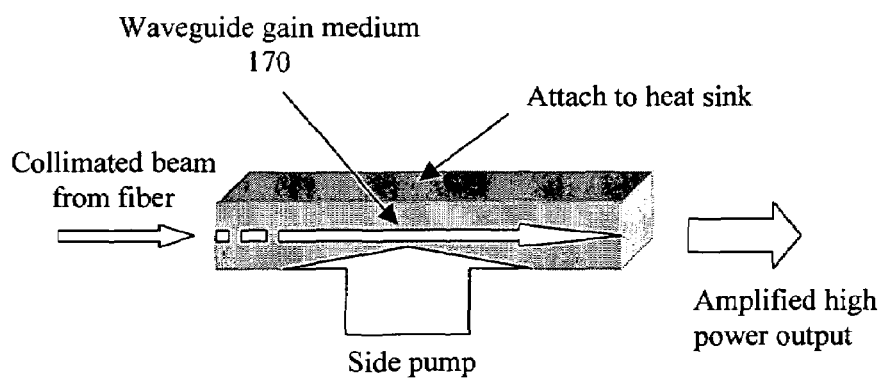
Fig. 2

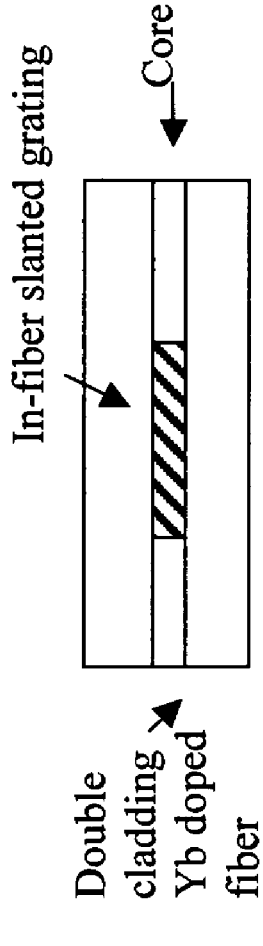
Fig. 4A
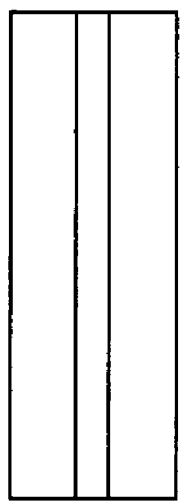
Fig. 4A-1
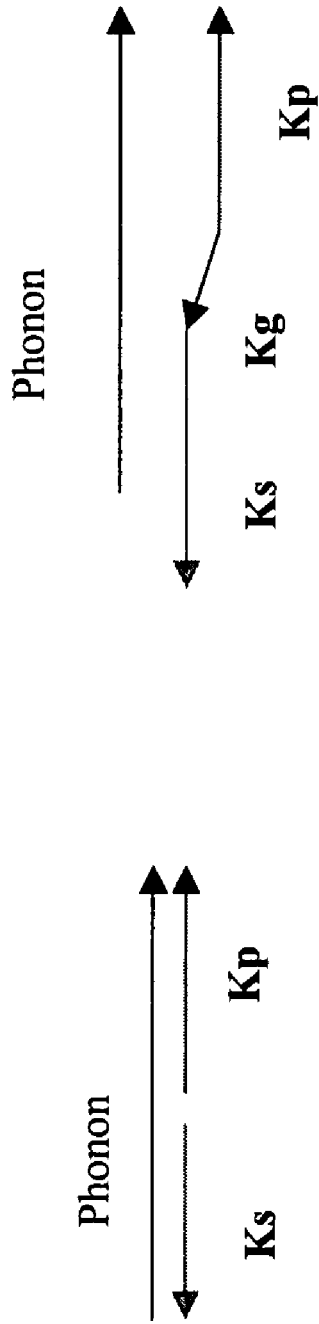
Fig. 4B
Fig. 4B-1

HYBRID HIGH POWER LASER TO ACHIEVE HIGH REPETITION RATE AND HIGH PULSE ENERGY

This Formal Application claims a Priority Date of Aug. 5, 2004 benefited from a Provisional Patent Application 60/598,836 filed by the same Applicant of this Application.

FIELD OF THE INVENTION

The present invention relates generally to apparatuses and methods for providing short-pulsed mode-locked fiber laser. More particularly, this invention relates to new configurations and methods for providing a hybrid high power laser to achieve high repetition rate and high pulse energy.

BACKGROUND OF THE INVENTION

Even though there are increasing demands for applications of the high energy and high pulse repetition rate (PRR) laser systems, however, these system often have difficulties to achieve good pulse to pulse energy stability (PPES) and low time jitter (TJ). Practical applications of the high-energy laser systems with high PRR are therefore hindered due to these technical difficulties. Specifically, the most common technique to achieve high repetition rate with short and high-energy pulse and high peak power laser operation is to implement the laser systems with technologies of the Q-switch regime. Since its invention in 1961 Q-switch technology became a very powerful technical development in modern solid-state lasers. Different techniques have been proposed to apply the Q-switch techniques in the laser cavity. The most important and efficient active Q-switch techniques presently employed by those of ordinary skill in the art are acousto-optical and electro-optical. Each of these techniques uses a related optical phenomenon, which makes it possible to switch the Q factor of the laser resonator. Both active Q-switch techniques perform very well at low PPR laser systems such as PPR rate at a few Hz to a few hundreds of Hz and also providing leak free, i.e. practical absence of pre-lasing and post-lasing oscillations, Q-switch operation. More detail descriptions are described in several technical publications that includes H. Zhang et. Al "Diode-end-pumped electro-optically Q-switched Nd:YLF slab laser", Appl. Opt., vol. 43 (14), 2004, pp. 2940-2943. K. Du et. al. "Electro-optically Q-switched Nd:YVO4 slab laser with a high repetition rate and a short pulse width", Opt. Lett., vol. 28 (2), 2003, pp. 87-89. Tiyanagisawa et. al. "11 mJ, 15 Hz single-frequency diode-pumped Q-switched Er, Yb: phosphate glass laser", Opt. Lett., vol. 26(16), 2001, pp. 1262-1264. Z. Chen et al. "Enhanced Q-switching in double-clad fiber lasers", Opt. Lett., vol. 23 (6), 1998, pp. 454-456.

However, when there are requirements for the solid-state laser with higher pulse energy of several joules and increasing PRR rates to 10-100 kHz the Q-switch system starts to encounter new problems in achieving highly stable Q-switched laser operation in both energy and time domain. The following just lists a coupled of key issues.

1) The first problem is the pulse-to-pulse energy stability (PPES). The most current state-of-art Q-switch lasers use solid-state laser materials with low energy storage time like Nd:YVO4; Nd:GdVO4 where $\tau \sim 0.07$-$0.1$ ms compared to 0.23 ms for Nd:YAG or 1 ms for Yb:YAG systems. They can only achieve pulse-to pulse energy stability along with very small time jitter at PRR up to 10-15 kHz for an expense of reduced Q-switched pulse energy compared to Nd:YAG and Yb:YAG which perform well at only up to ~5 and 1 kHz respectively. None of these lasers can go up to 100 KHz PRR while preserving high PPES and low TJ.

2) The second problem is related to high energy with Joule level of giant pulse. The acousto-optical modulators are not able to provide necessary contrast between high and low Q factors of the resonator and as a consequence such systems generate pre- and post lasing oscillations. This reduces Q-switch laser PPES and TJ along with decreased efficiency. On the other hand, the electro-optical modulator uses high voltage and that restricts the possibility to scale the pulse repetition rate over 100 Hz. The system performance can not meet current requirements of 1 kHz-100 kHz laser systems with high pulse-to-pulse stability and small timing laser pulse jitter.

For these reasons, even that the Q switching technology is considering a powerful way of getting high energy operation of lasers, there are still bottlenecks of the technologies of the Q switched lasers. Since its invention in 1961 Q-switch technology became a very powerful technique in modern solid-state lasers development. As it well known the main advantage of the Q-switch technology compared to other pulse creating methods is a possibility to create a giant pulses with incredibly high peak power of up to MW-GW level.

Different techniques have been proposed to Q-switch the laser cavity. The most important and efficient active Q-switch techniques presently employed are acousto-optical and electro-optical. Each of these techniques uses a related optical phenomenon, which makes it possible to switch the Q factor of the laser resonator quickly. Electro-optical modulators, which based on a polarization rotation principle in electro-optically active materials like DKDP or LiNbO3 provide reliable switch of the laser cavity Q-factor but require high voltage applied to the electro-optically active material. The typical voltage range for half wave or quarter wave polarization rotation in electro-optical modulators is 2-10 kV which make it problematic to use such systems in high repetition rate, high energy lasers with PRR over ~50-70 Hz. From another hand Acousto-Optical modulators which use the phenomenon of the intra-cavity laser beam diffraction on an acoustical grating created in the modulator crystals provide relatively fast, i.e., approximately microseconds, switch of the cavity Q-factor and high repetition rate Q-switching, may not provide enough contrast of the laser cavity Q factor in ON and OFF regime because of the finite diffraction grating efficiency in required order of diffraction and low diffraction angle. However, when the requirements for the solid-state laser pulse energy and PRR go up to the level of several Joules and 10-100 kHz, respectively, Q-switch starts facing new problems in achieving highly stable Q-switched laser operation in both energy and time domain. Each of these issues is further discussed below.

The first problem which arises at high PPR from the fundamental requirement for the pump pulse duration (i.e. timing in laser Q-switch operation) is the pulse to pulse energy stability (PPES)). If the laser material storage time is $\tau$, the necessary pump pulse duration (PPD) to achieve the maximum energy per Q-switch pulse should not exceed $1.1\tau$ before the Q-switch modulator raise the loss in the laser resonator. From another hand reducing the pump pulse duration below $\tau$ obviously not only reduces the Q-switched laser pulse energy as it happens in low PRR systems but also creates a condition for poor pulse-to-pulse energy stability and pulse time jitter in high repetition rate regime as a result of the pulse-to-pulse build up time change. The only reliable solution of such problem is to use solid-state laser materials with low energy storage time like Nd:YVO4; Nd:GdVO4 where τ~0.07-0.1 ms compared to 0.23 ms for Nd:YAG or 1 ms for Yb:YAG systems. This gives the possibility to achieve high pulse-to pulse energy stability along with very small time jitter at PRR up to 10-15 kHz for an expense of reduced Q-switched pulse energy compared to NdYAG and Yb:YAG which perform well at only up to ~5 and 1 kHz respectively.

The second problem in Q-switched laser development is related to high energy systems when one need to obtain Joule level of giant pulse energy. In such situation acousto-optical modulators are not able to provide necessary contrast between high and low Q factor of the resonator during operation and as a consequence create pre- and post lasing oscillation reducing Q-switch laser efficiency along with decreased PPES and TJ. Electro-optical modulator becomes the only reliable Q-switch approach, which provides practically infinite loss in the laser cavity for the low Q stage of the switching process. However, as it is mentioned above, high voltage used in the electro-optical modulators restricts the possibility to scale the pulse repetition rate over ~100 Hz which doesn't fit current Army requirements of 1 kHz-100 KHz laser systems with high pulse-to-pulse stability and small timing laser pulse jitter.

Another difficulty encountered by the conventional laser systems is the thermal lens implemented in the gain medium, the thermal lens usually restricts the energy/power scaling and degrade the laser beam quality in traditional solid-state bulk laser systems. Several publications have discussed these issues. G. P. Lee, et al., "980 nm diode pumped Yb doped Q switch fiber laser." Electron. Lett. 31(21), 1836-1837(1995). G. P. Lee, et al., "Q switched erbium doped fiber laser utilizing a novel large mode area fiber." Electron. Lett. 33(5), 393-394(1998). V. Dominic, et al., "110 W fiber laser," Proc. CLEO'99, PD paper CPD26 (1999). B. Desthieux, R. L. Laming, and D. N. Payne, "111 kW Pulse amplification," Appl. Phys. Lett. 63(5), 585-588 (1993). However, these publications have not provided effective methods to overcome the problem of beam quality degradation caused by the thermal lens implementation.

In addition to the above-discussed problems, there are also difficulties related to the nonlinear effects and SBS mitigation in optical amplifier. For high power optical amplifier, there are several issues relating to its power handling as discussed in many prior publications. Specifically, the publications include D. Taverner, et al., "Generation of high energy pulses using a large mode area erbium doped fiber amplifier," Proc. CLEO'96, 496-497 (1996). L. Goldberg, et al., "Highly efficient 4 W Yb doped fiber amplifier pumped by a broad stripe laser diode," Opt. Lett. 24 (10), 673-675 (1999). A. Galvanauskas, et al., "Compact ultra high power laser system," SPIE 2377, 117-126 (1995) S. Hofer, et al., "Single frequency master oscillator fiber power amplifier system emitting 20 W of power," Opt. Lett. 26 (17), 1326-1328 (2001). D. Rafizadeh, et al., "Kilowatt pulses from a single mode erbium doped amplifier," Electron. Lett. 317-318 (1994). P. A. Champert, et al., "Multiwatt average power continua generation in holey fibers pumped by kilowatt peak power seeded Yb fiber amplifier," Appl. Phys. Lett. 81(12), 2157-2159 (2002). D. C. Brown and H. J. Hoffman, "Thermal, stress, and thermal-optic effects in high average power double clad silica fiber lasers," IEEE J. Quantum Electron. 37 (2), 207-217 (2001). Raman Kashyap, Fiber Bragg Gratings, Academic Press, New York, 1999. Jian Liu, Paul Wysocki, M. Andrejco, and Bera Palsdottir, "L-band Erbium doped silica fibers and their applications," (*invited paper*), *Photonics West'2002, San Jose, Calif.* Warren Smith, *Modern Optical Engineering*, McGraw-Hill (New York), 2000. E. W. Taylor, et al., "*Gamma-Ray Induced Effects in Erbium-Doped Fiber Optic Amplifiers*", Proc. SPIE, Vol. 3440, 19-24 July 98, San Diego, Calif. First, power saturation and nonlinear effects are two main contributions. They are all related to the fiber structure. The nonlinear effects such as SBS and stimulated Raman scattering (SRS) are also correlated with power and linewidth of the signal. Secondly, the configuration of the optical amplifier and ASE cleanup has significant effects on its performance, especially at a wavelength of 1064 nm. Thirdly, pump wavelength selection and coupling scheme limits the pump power delivery and amplifier stability and efficiency.

Therefore, a need still exists in the art of fiber laser design and manufacture to provide a new and improved configuration and method to provide a hybrid high power laser to achieve high repetition rate and high pulse energy such that the above-discussed difficulty may be resolved.

SUMMARY OF THE PRESENT INVENTION

An aspect of the present invention is to provide a new pulse shaping and spectral shaping technique is disclosed in this invention to achieve the purpose of resolving the difficulties arising from the issues related to Q-switched solid-state lasers. The laser system achieves high repetition rate (1 kHz-100 kHz) and high pulse-to-pulse energy stability with small timing jitter of the laser pulses and scalable to the Joule pulse energy level. The laser system of this invention employs new approach with a hybrid fiber/waveguide master Oscillator-High Power Amplifier (MOPA) laser system in combination with the pulse shaping technology that allows not only to scale the fiber laser pulse energy to the multi-Joule level with high pulse-to-pulse energy stability but also achieve precise control of laser pulse timing jitter in a scale of <100 ps that is at least 5 to 10 time more accurate than for Q-switched systems where the same parameter reaches 500-1000 ps range. By providing a laser system of this invention, the above-described difficulties encountered in the prior art can be resolved.

Briefly, in a preferred embodiment, the present invention discloses a fiber laser cavity includes a laser gain medium for receiving an optical input projection from a laser pump. The gain medium includes a set of fiber Bragg gratings for reducing a Stimulated Brilliouin Scattering (SBS) and Stimulated Raman Scattering (SRS). In a preferred embodiment, the gain medium further includes a Yb-doped fiber (YDF) with the fiber Bragg gratings written to a core of the YDF. In another preferred embodiment, the gain medium further includes a Yb-doped fiber (YDF) with the fiber Bragg gratings written to a core of the YDF for suppressing an amplified spontaneous emission (ASE). In another preferred embodiment, the fiber laser cavity further includes a fiber bragging grating (FBG) pump reflector for reflecting a residual pump back from the gain medium. In another preferred embodiment, the fiber laser cavity further includes a waveguide amplifier receiving an optical transmission from the FBG pump reflector as a last stage of the laser cavity for scaling up an output laser power. In another preferred embodiment, the waveguide amplifier further receiving an amplifying signal from a side pump for scaling up the output laser power. In another preferred embodiment, the waveguide amplifier further includes a heat sink attached to the waveguide amplifier opposite the side-pump for reducing a thermal effect from scaling up the output laser. In another preferred embodiment, the fiber laser cavity further includes a seed laser pump for pumping a seed laser to the gain medium wherein the seed laser pump and the side pump are synchronized for controlling a pulse width of the output laser. In another preferred embodiment, the laser cavity is provided for tuning the pulse width of the output laser from about one nano second (1 ns) to thirty nano second (30 ns). In another preferred embodiment, the fiber laser cavity further includes an electronic controller for controlling the seed pump for enabling a programmable repetition rate (PRR) for the output laser. In another preferred embodiment, the fiber laser cavity further includes an electronic controller for controlling the seed pump for enabling a programmable repetition rate (PRR) for the output laser for tuning the PRR from about 1 KHz to 100 Khz. In another preferred embodiment, the laser cavity is provided for tuning the output laser for controlling a timing jitter below 100 ps. In another preferred embodiment, the laser cavity is provided for generating the output laser having an output power up to about 270 watts over a 30 dB gain. In another preferred embodiment, the laser cavity is provided for generating the output laser with a pump power conversion efficiency of approximately 85%.

In a preferred embodiment, this invention further discloses a method for configuring a fiber laser cavity that includes a step of projecting from an optical input from a laser pump to a gain medium and reducing a Stimulated Brilliouin Scattering (SBS) and Stimulated Raman Scattering (SRS) by forming a set of fiber Bragg gratings on the gain medium. In a preferred embodiment, the step of forming a set of Bragg gratings on the gain medium further includes a step of forming the set of Bragging gratings on a Yb-doped fiber (YDF) by writing the fiber Bragg gratings to a core of the YDF. In another preferred embodiment, the step of forming a set of Bragg gratings on the gain medium further includes a step of forming the set of Bragging gratings on an Yb-doped fiber (YDF) for suppressing an amplified spontaneous emission (ASE). In another preferred embodiment, the method further includes a step of reflecting a residual pump back from the gain medium by using a fiber bragging grating (FBG) pump reflector. In another preferred embodiment, the method further includes a step of receiving an optical transmission from the FBG pump reflector in a waveguide amplifier as a last stage of the laser cavity for scaling up an output laser power. In another preferred embodiment, the method further includes a step of receiving an amplifying signal from a side pump into the waveguide amplifier for scaling up the output laser power.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1A is functional block diagram for a fiber laser system of this invention and FIG. 1B is an explosive view of a segment of the YDF implemented in the laser system of FIG. 1A.

FIG. 2 is functional block diagram for a waveguide amplifier for integrated with the laser system shown in FIG. 1A as a hybrid laser system.

FIGS. 4A and 4A-1 show the phase matching condition without gratings and

FIGS. 4B and 4B-1 are the phase matching condition with gratings.

DETAILED DESCRIPTION OF THE INVENTION

Figure 3A:
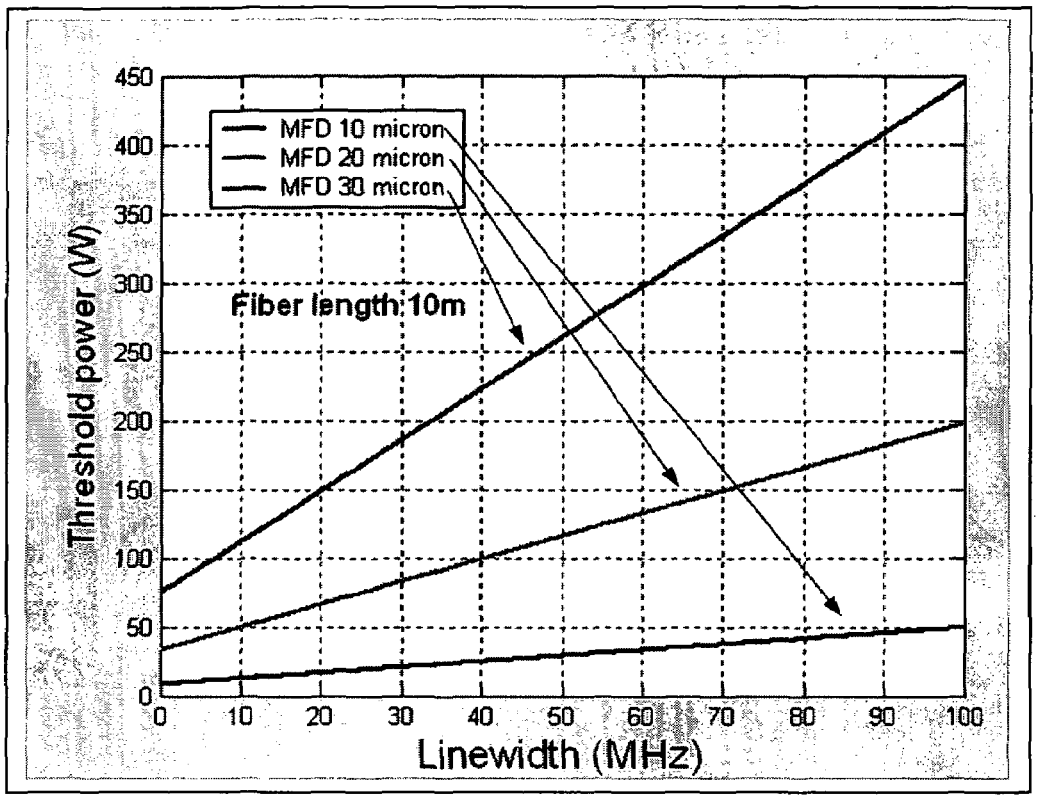
FIGS. 3A and 3B are threshold powers of the SBS for various fibers.

FIG. 1A shows a functional block diagram for illustrating a preferred embodiment of a fiber laser 100 this invention. The fiber laser system 100 includes a seed laser 105 operated at a wavelength of 1064 nm controlled by an electronic controller 110 to provide a programmable pulse repetition rate (PRR) and pulse width. The output from the seed laser 105 is transmitted through a coupling optics 115 that also coupled to the pump lasers 120 for projecting to an Yb-doped fiber (YDF) 125 for transmitting the optical signals to a fiber Bragg grating 130. The fiber Bragg grating 130 is applied to reflect the residual pump back. This enables the use of a short length of fiber to obtain a same level of output power and to reduce the effect of Stimulated Brilliouin Scattering (SBS) and Stimulated Raman Scattering (SRS). The pump lasers 120 generate a pump wavelength of 965 nm. The pump wavelength is particularly selected for pumping the Yb-doped fiber 125 in compensation and also to balance of temperature induced wavelength shift and power change. This will eliminate the use of TEC (thermal effect controller) and other means of temperature control while providing a stable performance of the optical amplifier.

Referring to FIG. 1B that shows an explosive view of a segment of the Yb-doped fiber 125 that shows a fiber grating 128 is written in Yb-doped fiber core 129 to suppress the strong ASE (amplified spontaneous emission) at shorter wavelength band around 980 nm. The fiber grating 128 written into the core 129 of the YDF 125 also increases the pump efficiency and breaks the phase match of SBS. These special effects provide a new and entirely different approach to overcome the Stimulated Brilliouin Scattering (SBS) problems. Compared to the conventional technique of applying large mode fiber and/or multi mode fiber, the new and improved method as that disclosed in FIG. 1 provides a much more effective and economic implementation.

The output optical signals are then projected to a waveguide amplifier 160 as that shown in FIG. 2 as the last amplifier stage of the system. The waveguide amplifier 160 receives a collimated beam from the fiber laser 100 into a gain medium 170. The gain medium 170 also receives amplifying signals from a side pump 180 that allows an option to scale the laser energy to the level of several Joules without optical damage, and to suppress optical non-linearity. The gain medium 170 further is attached a heat sink (not shown). The heat sink is provided to resolve the thermal lens issues in the gain medium which usually restrict the energy/power scaling and degrade the laser beam quality in traditional solid-state bulk laser systems as that discussed in several prior art publications discussed above. In a preferred embodiment, the final amplifier stage 160 includes a waveguide 170 with cross section of 1×10 (0.1 cm$^2$) or 1.5×20 mm (0.3 cm$^2$) with the side pump 180 that is side pumped by high power horizontal diode laser bars and the damage level threshold for ns pulses in dielectric materials such as a silica or crystal is in the order of ~10 J/cm$^2$. A damage free laser operation of up to 1-3 Joule pulse energy is generated as the output from the waveguide gain medium 170. The side pump 180 is further programmed to synchronize with the seed lasers 105 to accurately control the laser pulses with precise time sequences and the pulse length.

A laser system as that shown in FIGS. 1A to 2 provides a single platform that integrates the passive optical components with the active pump. This integrated platform significantly reduces the size and cost of the amplifiers. Implementation of a fiber laser system as shown enables a programmable high repetition rate (PRR) and pulse width wherein the pulse width can be tuned form 1 ns to 30 ns. The PRR can be tuned from 1 kHz to 100 kHz. The fiber laser system as shown further achieves high stable pulse-to-pulse energy stability. The pulse shaping and spectral shaping technology can provide excellent pulse energy stability within 1%. Furthermore, the fiber laser systems provide accurate pulse timing control. The timing jitter is only caused by the control electronics and can be controlled below 100 ps.

The fiber laser system further generates high output power and energy. By using the spectral shaping approach, the system can obtain an amplifier having large output power up to 270 W (over 30 dB gain) and high pump power conversion efficiency as high as 85%, with minimum nonlinear effects such as SBS and SRS, by using commercially available YDF. By using waveguide amplifier, the power can scale up to tens of kW and the pulse energy to several Joules while maintaining diffraction limited beam quality.

Additionally, the fiber system 100 further has high wall plug efficiency because of the entirely new and different spectral shaping approach disclosed in this invention. The spectral shaping approach is achieved by using a) an ASE filtering in Yb-doped fiber 125; b) SBS reduction by in-fiber grating; and c) feed back residual pump light, and (d) employment of all passive cooling of pump and gain medium. Compared to conventional technology, about 20% higher in efficiency is achieved. Additionally, the fiber laser system of this invention achieves a high signal-to-noise ratio. Efficiently suppression of the ASE and nonlinear effects by in-fiber grating provides high signal power level while maintaining low noise level.

With the implementation of heat sinks, the fiber system of this invention provides convenient thermal control. The configuration of this system provides good surface contact with substrate and a large surface to volume ratio of the fiber waveguide 170. The increased contact surface of the heat sink to the waveguide 170 provides less constraint on thermal management issues compared with thermal issues as that caused by thermal lens and thermal stress commonly encountered by the conventional high power laser systems. The fiber laser system further provides a system configuration adaptable for customizing a laser system at low cost because the system can be configured with commercially available fibers and waveguides and optical components.

A new pulse shaping and spectral shaping technique is disclosed in this invention to achieve the purpose of resolving the difficulties arising from the issues related to Q-switched solid state lasers. The laser system achieves high repetition rate (1 kHz-100 kHz) and high pulse-to-pulse energy stability with small timing jitter of the laser pulses and scalable to the Joule pulse energy level. The laser system of this invention employs new approach with a hybrid fiber/waveguide master Oscillator-High Power Amplifier (MOPA) laser system in combination with the pulse shaping technology that allows not only to scale the fiber laser pulse energy to the multi-Joule level with high pulse-to-pulse energy stability but also achieve precise control of laser pulse timing jitter in a scale of <100 ps that is at least 5 to 10 time more accurate than for Q-switched systems where the same parameter reaches 500-1000 ps range. The main advantage of the pulse shaping technology is independent and precise control of the laser pulse width in the range of 1-30 ns, pulse repetition rate in the range from 1 kHz to tens of MHz and at the same time maintaining the laser pulse time jitter less within less than 100 ps.

Figure 3B:
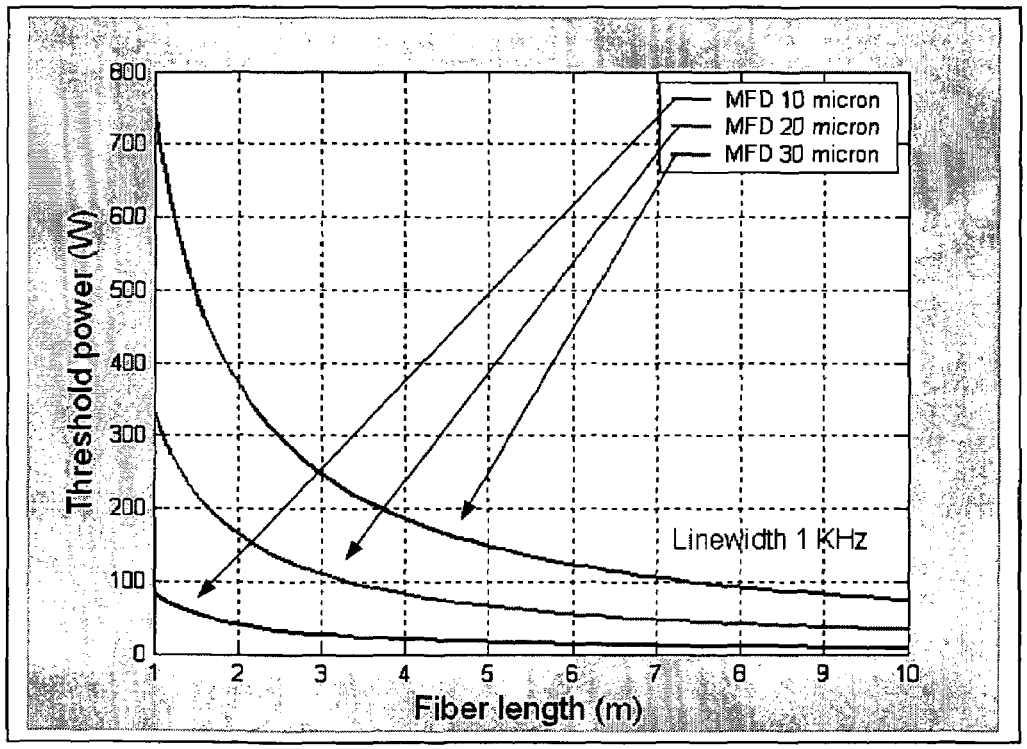

According to above descriptions, the laser system of this invention achieve over 40% wall plug efficiency by overcoming the nonlinear effects and SBS mitigation in optical amplifier. The system parameters are optimized to achieve the performance. First, the SBS effects have to be reduced by innovative approaches. The threshold powers for SBS and SRS are given as:

$$P_B^{th} = \frac{42 A_e}{g_B L}\left(1+\frac{\Delta v_s}{\Delta v_B}\right), \quad (1)$$

and $$P_R^{th} = \frac{16 A_e}{g_R L}, \quad (2)$$

respectively. In Equations (1) and (2), $g_B=4\times10^{-9}$ cm/W and $g_R=1\times10^{-11}$ cm/W FIGS. 3A and 3B plot the threshold power for SBS as a function of linewidth and fiber length respectively under three typical mode field diameters (MFD) of commercially available fibers. It is shown that even for short fiber length, the SBS has detrimental effects on the performance of the fiber laser due to a high peak power. For SRS, its threshold power is two orders of magnitude larger that that of the SBS and is the secondary issue to be considered.

The SBS is the interaction of light with sound waves in fiber. Sound waves in fiber cause a variation in the index of refraction corresponding to the density variations of the wave. The index gratings can diffract the light if the Bragg condition is satisfied. In single mode fiber, the only possible diffraction from these moving gratings corresponds to reflection in the backward direction. FIGS. 4A and 4A-1 show such phase matching condition for SBS. The laser system of this invention shown in FIGS. 4B and 4B-1 mitigates the SBS effects by feeding back the pump power for reducing the fiber length and integrating a fiber grating (spectral shaping) in the power amplifier to introduce a perturbation to the SBS to make the phases between the signal wave and acoustic wave (phonon) mismatched. To mitigate the SBS, fiber gratings 128 are written in core 129 of the YDF 125. In the grating regions, the SBS phase matching condition is broken due to the introduction of extra fiber grating vector by comparing the optical transmissions as that shown in FIGS. 4A and 4B. Moreover, the gratings 128 separate the fiber into several segments and each segment has shorter length that that significantly increases the SBS threshold.

Figure 5A:
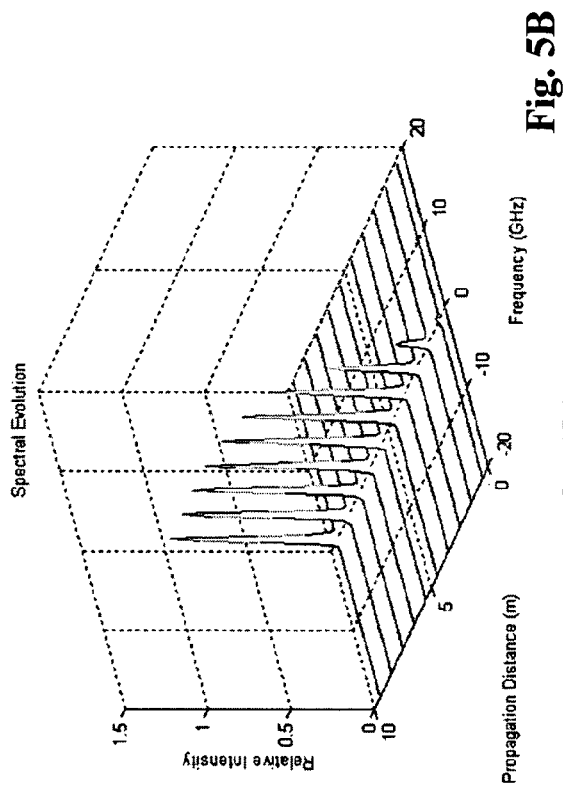
FIGS. 5A and 5B are simulation results for high power amplifiers with spectral shaping and FIGS. 5C and 5D are simulation results for high power amplifiers without spectral shaping.
Figure 5B:
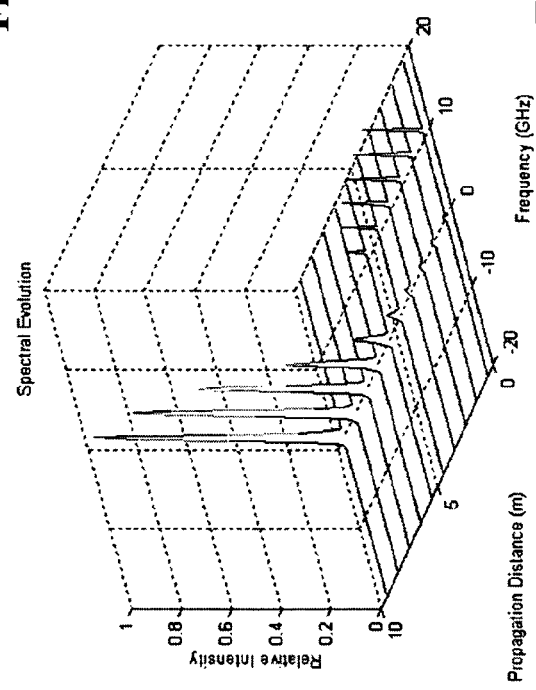
Figure 5C:
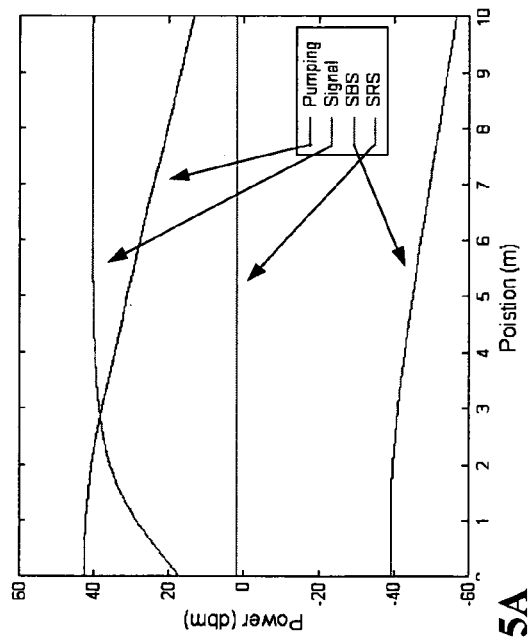
Figure 5D:
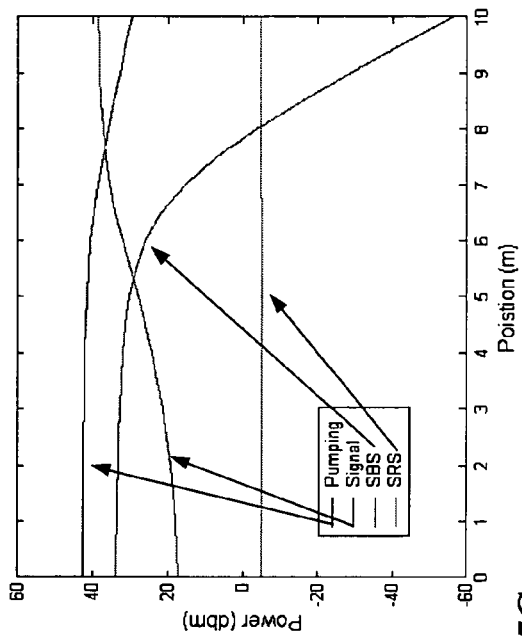

Simulation analysis is performed with a fiber with a large mode area and high doping concentration to provide a large saturation power and high threshold powers for SBS and SRS. The simulation analysis of signal propagation and amplification in the fiber amplifier is carried out in consideration of the SBS and SRS effects for a commercially available YDF with a mode field diameter of 30 micron. FIGS. 5A and 5B are simulation results for high power amplifiers with spectral shaping and FIGS. 5C and 5D are results without spectral shaping for suppression of SBS. The results show an example of one design to amplify signal to obtain a 20 dB gain and a comparison with and without spectral shaping to illustrate the improvement of spectral shaping in suppressing the SBS and SRS. These results provide important reference for system implementation of a MOPA (master oscillator power amplifier).

The fiber gratings 128 used in the YDF amplifier 125 serves as two main purposes. First, by manipulating the structure and bandwidth of the grating, it can be used to suppress SBS in the amplifier 125. Second, it works as an ASE filter to clean up the spontaneous emission outside the signal band. So high efficiency and low noise can be achieved in cooperating with the amplifier design.

To achieve an efficient amplification of a signal at 1064 nm, it is important to suppress ASE noise level at wavelengths shorter than 1064 nm. This is similar to what are carried out for the L band Erbium doped fiber amplifier as that discussed by Jian Liu, Paul Wysocki, M. Andrejco, and Bera Palsdottir, in "L-band Erbium doped silica fibers and their applications," (invited paper), Photonics West'2002, San Jose, Calif. The disclosure in that publication is hereby incorporated by reference in this Patent Application.

Figure 6B:
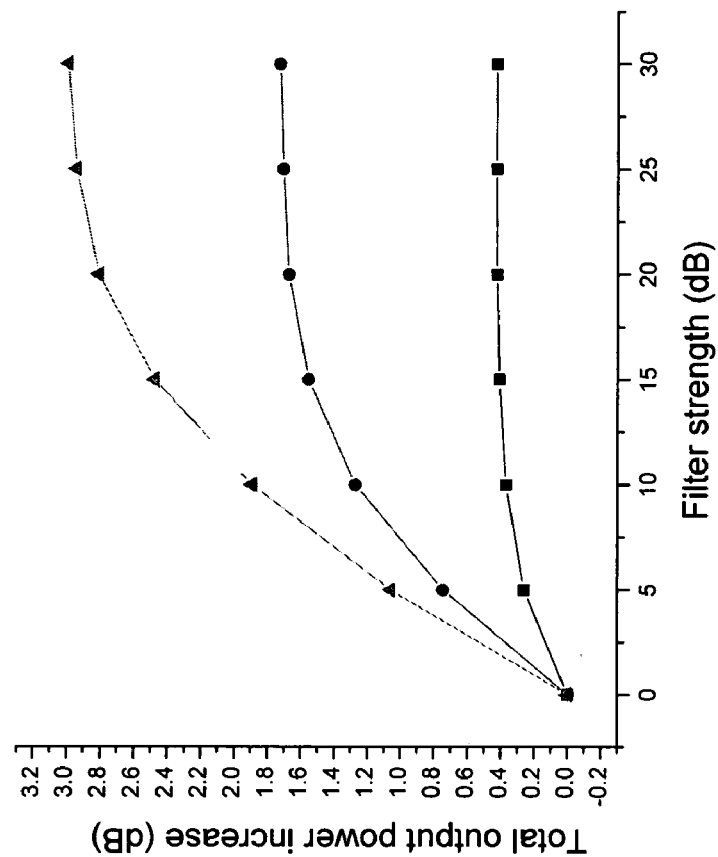
FIGS. 6A and 6B are simulation results for showing the performance improvement by spectral shaping.
Figure 6A:
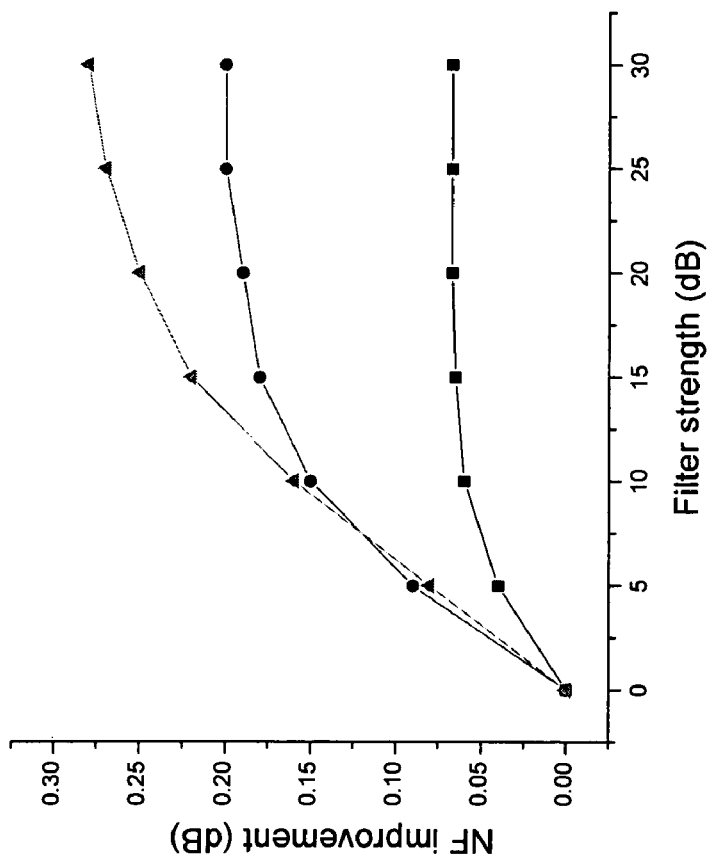
Figure 7A:
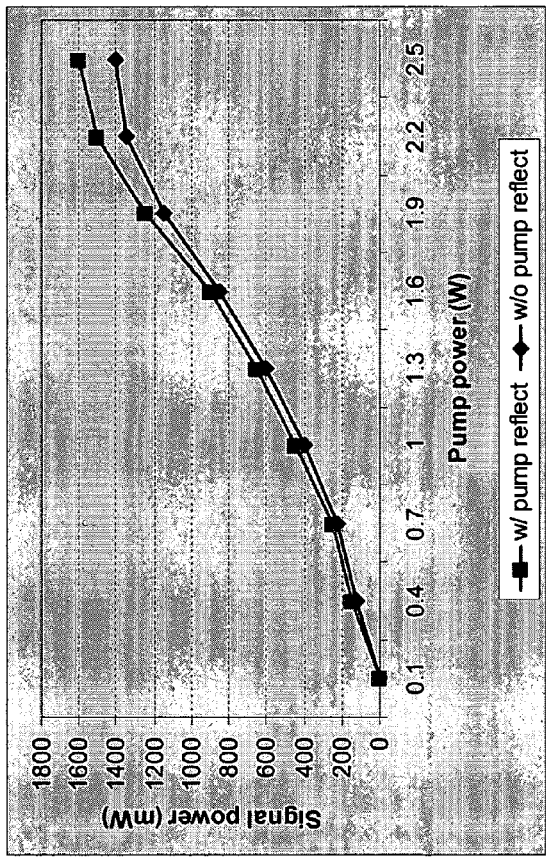
FIGS. 7A and 7B are experimental results and simulation results respectively for showing the performance with and without pump reflection.
Figure 7B:
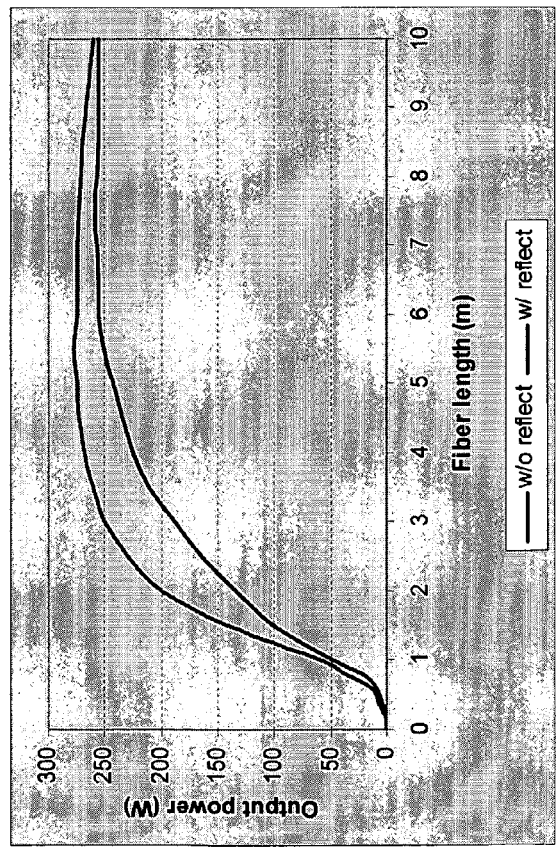

FIGS. 6A and 6B show the simulation results on performance improvement with one spectral shaping fiber grating used in the high power amplifier. The input signal is at a wavelength of 1064 nm and at three power levels of 50 mW, 100 mW, and 300 mW. It is shown that the spectral shaping fiber grating is especially useful at low input signal power levels and as high as 3 dB in power and ~0.3 dB in NF can be achieved. To show the pump reflection effect, an experiment was setup to show the improvement by reflecting the residual pump light back into the YDF. FIGS. 7A and 7B show the experimental results at a signal wavelength of 1064 nm for a readily available low power YDFA built in the laboratory. The input signal power is set at 50 mW. It shows about 15% improvement on output power was achieved by using the pump reflection approach. The simulation further shows that optimization can be done to reduce the length of the fiber by 30% to 50% while achieving high output power over 270 W (34 dB gain) with a pump conversion efficiency as high as 85%.

Figure 8C:
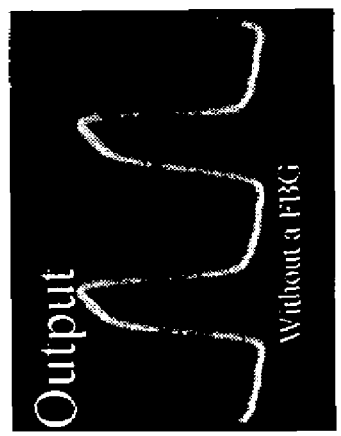
FIGS. 8A to 8C are diagrams of Gaussian shape pulses as the optical signals propagate in the fiber laser.
Figure 8B:
Figure 8A:
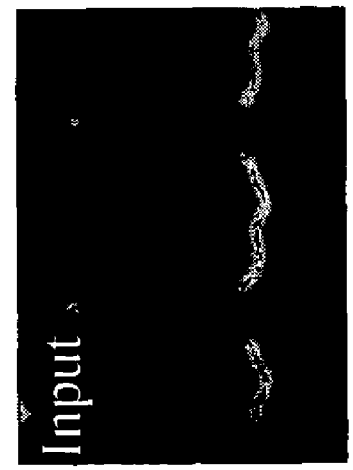

A preliminary experiment has been carried out to demonstrate the feasibility of pulse shaping concept with electronic drivers for direct modulated laser and high power pumps. The optical and electronic components can be integrated and placed on a compact PCB board and use it to drive a single 20 W pump diode. FIGS. 8A to 8C show the examples of generation and propagation of Gaussian shape pulses in the fiber laser. The Gaussian shape pulses are generated by applying changes of the time sequence and pulse shapes of the driving current and bias of the direct modulation DFB laser. Strong pulse shaping effects are shown for Gaussian shape amplification. The pulse shape maintained their shape through all stages of amplifiers when using the FBG filter. The pulse-to-pulse stability is measured to be within 2%. However, when taking out the FBG, the pulse becomes distorted and degrades into a square shape pulse at the output. In the experiment, the 1 kW peak power is achieved. When the power level goes up to 100 kW, more serious nonlinear effects are encountered and more pulse shaping effect has to be taken to correct the distortion.

As that shown in FIG. 2, the employment of the laser waveguide amplifier technology at later amplifier stages of the system allows the laser system of this invention to scale the laser energy to the level of several Joules without optical damage, suppressed optical non-linearity and thermal lenses issues in the gain medium which usually restrict the energy/power scaling and degrade the laser beam quality in traditional solid-state bulk laser systems. In a preferred embodiment, the amplifier stage includes a waveguide 170 with cross section of 1×10 (0.1 cm$^2$) or 1.5×20 mm (0.3 cm$^2$) side pumped by high power horizontal diode laser bars and the damage level threshold for ns pulses in dielectric materials like silica or crystal is in the order of ~10 J/cm$^2$, the laser system can achieve a damage free laser operation of up to 1-3 Joule pulse energy.

The side pump 180 provides the Side pumped Waveguide amplifier 160 with several advantages when compared to the traditional bulk solid-state amplifier geometries or fiber amplifiers. The side pumped waveguide amplifier geometry allows the laser system to separate in space the pumping and the cooling and the amplification directions, and that in turn makes such system more reliable. The system is further more convenient to manufacture when compared with the conventional configurations.

Selecting appropriate aspect ration (AR) between the waveguide thickness and its width allows to scale the output power generated by the amplifier beyond the crystal thermal fracture limit by the factor of ~AR. For one preferred embodiment, the waveguide amplifier material is Nd:YAG (1064 nm) and the aspect ration is 10 (1×10 mm waveguide). The amplifier configuration provides the possibility to increase the thermal fracture limit to 250 W per each cm of the amplifier length compared to 25 W per cm in the case of the rod geometry. By selecting appropriate aspect ratio of the waveguide amplifier, the laser system of this invention can eliminate thermal lens in the X direction of the waveguide and control an existing thermal lens in Y direction and in turn this new configuration allows the flexibility to vary the pump/output power of the laser system without degradation of its beam quality.

Since a pump diode always experiences temperature dependence for both wavelength and power of output, there are wavelength drifts about 0.1-0.2 nm/degree depending on the structure and design of the diode. The allowable laser power output therefore decreases dramatically with increase of the temperature. A pump wavelength of 965 nm is implemented in this invention to compensate both wavelength drift and the passive power change. In the neighborhood of 965 nm, when temperature increases, the pump wavelength shifts toward longer wavelength and the power decreases. However, the YDF has a larger absorption coefficient at the longer pump wavelength. This helps compensate the power decrease caused by the temperature increase. Conversely when the temperature decreases, a reverse compensation also takes place such that the wavelength drifts due to temperature changes are minimized. This self-compensation allows the amplifier to operate passively with active temperature-wavelength adjustment control as that commonly implemented as the TEC and forced air-cooling system in other laser systems.

Figure 9A:
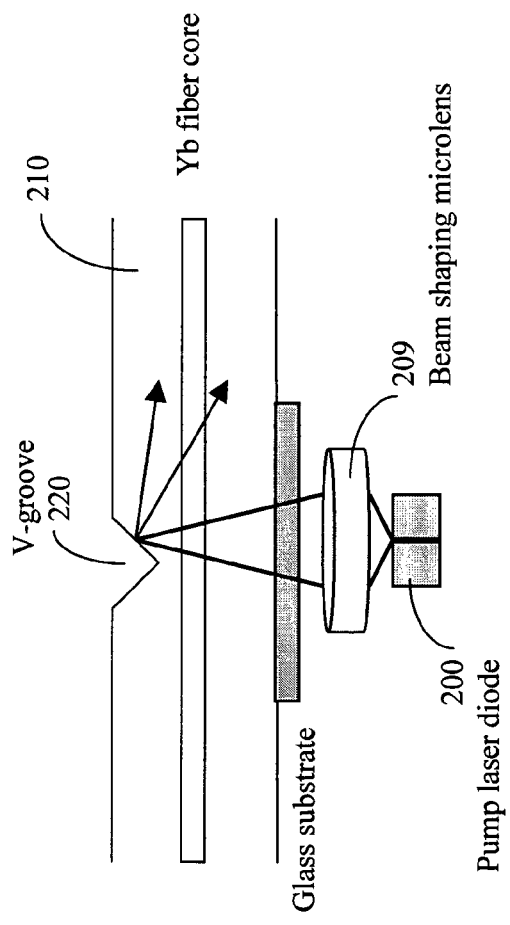
FIGS. 9A to 9B are functional block diagrams for showing side coupling of pump laser diode to the YDF and pump diode strip coupling to the YDF respectively.
Figure 9B:
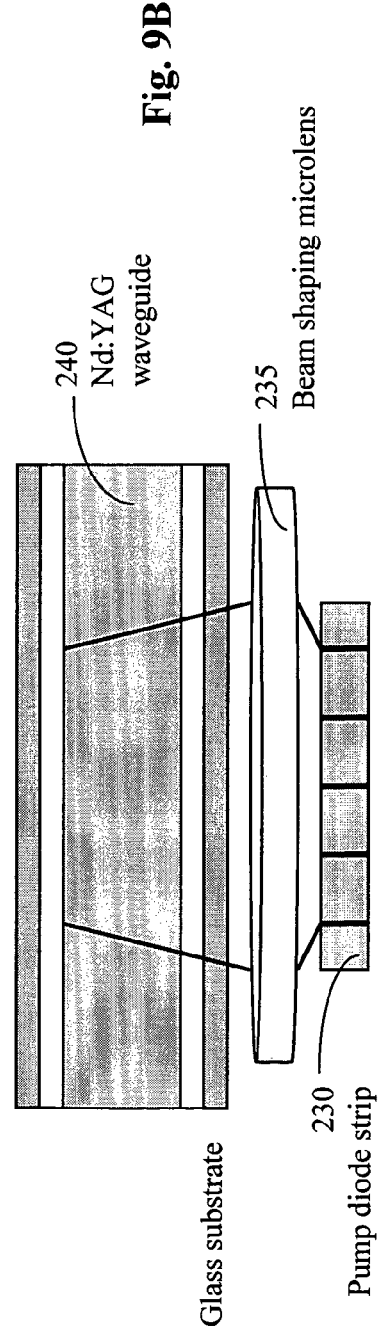

Efficiently coupling pump light from a laser diode into a double cladding YDF and waveguide gain medium (Nd: YAG) is critical to the wall plug efficiency. Side coupling proves to be the most compact and most efficient approach (90%) and have been widely used by optical power amplifiers. FIGS. 9A and 9B show a schematic diagram of side coupling. FIG. 9A shows a coupling method for coupling the light from the pump laser diode 200 into the fiber 210. The fiber 210 was etched into a V shaped wedge 220 on one side of the fiber, the pump light is focused by a lens 205 onto one side of the wedge 220 and total-internally reflect into the fiber cladding in amplifying the signal. FIG. 9B shows another coupling method for launching a pump diode strip 230 (multi diodes in one ship) into the waveguide amplifier 240 by using a beam shaping micro-lens 235. It will shape the pump beam into an elliptical beam and confine the pump within the waveguide in getting high overlap with the signal for efficient amplification. Excellent thermal dissipation for the diode is important to the performance and lifetime of the pump diode. Further analytical results show a good conductivity is required for the high power pump diode and the metal sink. Based on past experience, CVD diamond is a good candidate (thermal conductivity greater than 1000 W/mK) to bridge the metal substrate and the diode.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A laser system, comprising:
   a. a seed laser configured to emit input laser pulses;
   b. a laser pump configured to produce a pump light;
   c. a fiber-based laser gain medium comprising a fiber core, a cladding surrounding the fiber core, and a first fiber Bragg grating (FBG) in the fiber core, wherein the fiber-based laser gain medium is configured to receive the input laser pulses and the pump light at a first end of the fiber core, amplify the input laser pulses in response to the pump light, and output amplified laser pulses at a second end of the fiber core, wherein the first FBG is configured to break phase match of stimulated Brillouin scattering (SBS) in the amplified laser pulses, wherein the first FBG does not deflect a substantial portion of the amplified laser pulses out of the cladding;
   d. an optical coupling component configured to project the input laser pulses and the pump light into the laser gain medium; and
   e. a second FBG configured to pass the amplified laser pulses and reflect the pump light back to the fiber-based laser gain medium.

2. The laser system of claim 1, wherein the first FBG does not filter a substantial portion of the amplified laser pulses based on the polarization of the amplified laser pulses.

3. The laser system of claim 1, further comprising an electronic controller configured to control the seed laser to emit the input laser pulses at a predetermined repetition rate (PRR).

4. The laser system of claim 3, wherein the electronic controller is configured to tune the PRR to a range between about 1 KHz and about 100 KHz.

5. The laser system of claim 1, wherein the fiber-based laser gain medium is doped with Yb.

6. The laser system of claim 1, wherein the fiber-based laser gain medium comprises a wedge in the cladding, wherein the wedge is configured to reflect the pump light from the optical coupling component into the fiber core.

7. The laser system of claim 1, wherein the first FBG is configured to suppress amplified spontaneous emission (ASE) and stimulated Raman scattering (SRS) in the amplified laser pulses.

8. The laser system of claim 1, wherein the amplified laser pulses have pulse widths in a range between about 1 ns and about 30 ns.

9. The laser system of claim 8, wherein the amplified laser pulses have a timing jitter below 100 ps.

10. The laser system of claim 1, further comprising:
    a. a side pump configured to provide optical power; and
    b. a waveguide amplifier configured to receive the amplified laser pulses from the second FBG, amplify the amplified laser pulses in response to optical power provided by the side pump, and emit output laser pulses.

11. The laser system of claim 10, farther comprising a heat sink in thermal conduction with the waveguide amplifier, the heat sink being configured to reduce transfer heat from the waveguide amplifier.

12. The laser system of claim 10, wherein the seed laser is configured to be pulsed and to have an arbitrary pulse shape and the side pump is configured to be pulsed and the seed laser and the side pump are synchronized in order to amplify a determined pulse width in the output laser pulses.

13. The laser system of claim 10, wherein the side pump comprises:
    a. a laser diode configured to emit a light beam to provide the optical power; and
    b. a micro lens configured to focus the light beam to the waveguide amplifier.

14. A laser system, comprising:
    a. a fiber-based laser gain medium comprising a fiber core, a cladding surrounding the fiber core, and a first fiber Bragg grating (FBG) in the fiber core, wherein the fiber-based laser gain medium is configured to receive input laser pulses and a pump light at a first end of the fiber core, amplify the input laser pulses in response to the pump light, and output amplified laser pulses at a second end of the fiber core, wherein the first FBG is configured to break phase match of stimulated Brillouin scattering (SBS) in the amplified laser pulses, wherein the first FBG does not deflect a substantial portion of the amplified laser pulses out of the cladding, wherein the first FBG does not filter a substantial portion of the amplified laser pulses based on the polarization of the amplified laser pulses;
    b. an optical coupling component configured to project the input laser pulses and the pump light into the laser gain medium; and
    c. a second FBG configured to pass the amplified laser pulses and reflect the pump light back to the fiber-based laser gain medium.

15. The laser system of claim 14, farther comprising an electronic controller configured to control the seed laser to emit the input laser pulses at a predetermined repetition rate (PRR).

16. The laser system of claim 15, wherein the electronic controller is configured to tune the PRR to a range between about 1 KHz and about 100 KHz, wherein the amplified laser pulses have pulse widths in a range between about 1 ns and about 30 ns.

17. The laser system of claim 14, wherein the fiber-based laser gain medium comprises a wedge in the cladding, wherein the wedge is configured to reflect the pump light from the optical coupling component into the fiber core.

18. A laser system, comprising:
    a. a fiber-based laser gain medium comprising a fiber core, a cladding surrounding the fiber core, and a first fiber Bragg grating (FBG) in the fiber core, wherein the fiber-based laser gain medium is configured to receive input laser pulses and a pump light at a first end of the fiber core, amplify the input laser pulses in response to the pump light, and output amplified laser pulses at a second end of the fiber core, wherein the first FBG is configured to break phase match of stimulated Brillouin scattering (SBS) in the amplified laser pulses, wherein the first FBG does not deflect a substantial portion of the amplified laser pulses out of the cladding, wherein the first FBG does not filter a substantial portion of the amplified laser pulses based on the polarization of the amplified laser pulses;
b. an optical coupling component configured to project the input laser pulses and the pump light into the laser gain medium;
c. a second FBG configured to pass the amplified laser pulses and reflect the pump light back to the fiber-based laser gain medium;
d. a laser diode configured to provide optical power; and
e. a waveguide amplifier configured to receive the amplified laser pulses from the second FBG, amplify the amplified laser pulses in response to optical power provided by the laser diode, and emit output laser pulses.

19. The laser system of claim 18, wherein the seed laser is configured to be pulsed and to have an arbitrary pulse shape and the side pump is configured to be pulsed and the seed laser and side pump are synchronized to produce a determined pulse width in the output laser pulses.

20. The laser system of claim 10, wherein the seed laser is configured to be pulsed and to have an arbitrary pulse shape and the side pump is configured to operate continuous wave in order to amplify a determined pulse width in the output laser pulses.

21. The laser system of claim 18, wherein the seed laser is configured to be pulsed and to have an arbitrary pulse shape and the side pump is configured to operate continuous wave in order to amplify a determined pulse width in the output laser pulses.

22. The laser system of claim 1, wherein the first fiber Bragg grating is slanted.

23. The laser system of claim 14, wherein the first fiber Bragg grating is slanted.

24. The laser system of claim 18, wherein the first fiber Bragg grating is slanted.

* * * * *